Figure 1:
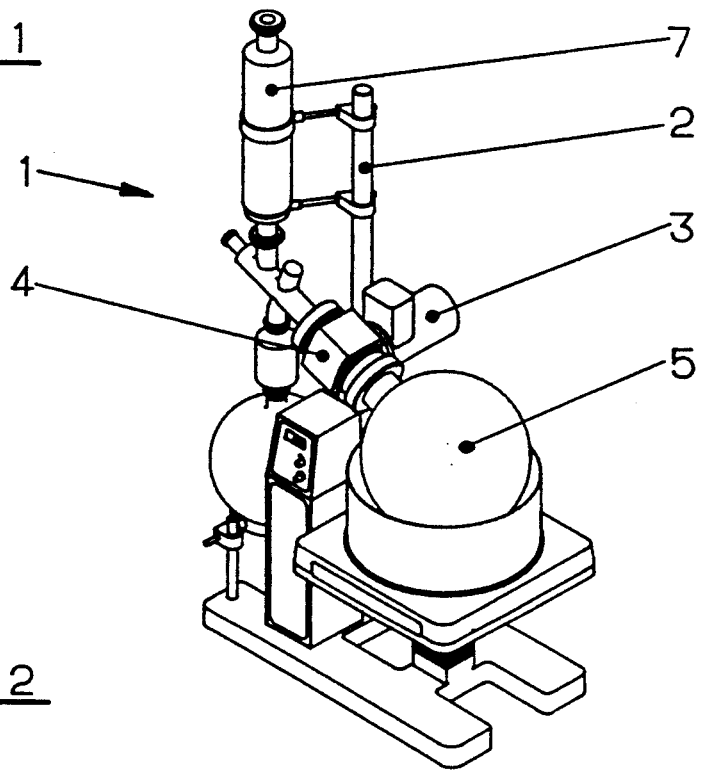

United States Patent [19]

Spring

[11] Patent Number: 5,243,836
[45] Date of Patent: Sep. 14, 1993

[54] SEALING DEVICE FOR A ROTARY EVAPORATOR

[75] Inventor: Arthur Spring, Flawil, Switzerland

[73] Assignee: Buchi Laboratorium-Technik AG, Flawil, Switzerland

[21] Appl. No.: 836,815

[22] Filed: Feb. 19, 1992

[30] Foreign Application Priority Data

Mar. 15, 1991 [CH] Switzerland .................. 803/91

[51] Int. Cl.[5] ................................................ F25B 3/00
[52] U.S. Cl. ...................................... 62/499; 62/50.7; 62/265; 277/95; 277/96.2
[58] Field of Search .............. 62/265, 499, 50.7; 277/95, 96.2

[56] References Cited

U.S. PATENT DOCUMENTS 2,805,558  9/1957  Knight ............................ 62/499
4,275,565  6/1981  Beck ............................... 62/50.7

FOREIGN PATENT DOCUMENTS 2534446   2/1977  Fed. Rep. of Germany.
3114449  10/1982  Fed. Rep. of Germany.
3641152   6/1988  Fed. Rep. of Germany.

OTHER PUBLICATIONS

Seals and Sealing Handbook: Jul. 1, 1986 pp. 237, 239, 241.

Primary Examiner—Ronald C. Capossela
Attorney, Agent, or Firm—Shoemaker and Mattare, Ltd.

[57] ABSTRACT

A sealing device for a rotary evaporator (1) possesses a two part vapor duct arrangement (6). With that, the component on the evaporator side (6a) is formed to rotate and the component (6b) on the cooler side is formed to be stationary. Both the components (6a, 6b) make contact with each other to form a seal in the area of the sealing surface (14).

10 Claims, 1 Drawing Sheet

U.S. Patent

Sep. 14, 1993

5,243,836

SEALING DEVICE FOR A ROTARY EVAPORATOR

The invention concerns a sealing device for a rotary evaporator with a rotating evaporation flask which is connected to a fixed position cooler by means of a vapour duct arrangement. Numerous types of these rotary evaporators are known and in use. For example, DE-A-25 34 446 shows a rotary evaporator with a vapour duct pipe for the transfer of the vapour through a holding and drive device, a shaft seal with a seal lip making contact on the vapour pipe in the manner of a scraper ring.

A vapour duct pipe is disclosed in DE-A-31 14 449 with a seal which is formed as an intermediate component.

Although these types of arrangements have proven themselves in practice, the tightness of the seals, and mainly also the longevity of the sealing systems, can be improved.

The purpose of the invention is to avoid the disadvantages of known systems, and therefore to create, in particular, a sealing arrangement for a rotary evaporator which will not be subjected to a high degree of wear, will be simple to construct, and economical and reliable in operation.

This task, according to the invention, is fulfilled in particular according to the characteristics of the patent claims.

Through the at least two part formation of the vapour duct arrangement, the ability of the sealing surface to be slid into the inner area of the drive device is achieved in the simplest way, so that the risk of tilting, and thus of seal leakage, is reduced. Apart from that, the two part formation of the arrangement, with regard to the sliding and sealing properties, allows combination of optimal materials for both the system components. At the same time, a sealing part can be produced especially simply if the facing sides of the components are themselves formed as the sealing surfaces. The sealing surfaces can, with that, be formed in accordance with demands; they can be manufactured in a particularly simple way if they are radial and run at an angle of 90° to the axis of the vapour duct arrangement.

With the two part arrangement, only one sealing surface arises. Naturally, it would also be conceivable, with appropriate cause, to construct the arrangement with numerous parts, for example, three.

With regard to wear resistance and resistance to aggressive media, system components made from ceramic or glass materials have particularly proven themselves. The face, respectively the sealing surfaces of these types of components can be optimally formed with regard to roughness and surface exactness.

The invention can be realised particularly advantageously if one of the parts comprises a ceramic material and the other component comprises a softer material.

In this case, plastic materials, in particular PTFE, respectively PTFE compounds, have been especially well proven.

The inclusion of a filler in the plastic material has been well tried in the further improvement of the sliding properties of the sealing parts. With that, preferably PTFE with a filler of glass, high performance plastic or carbon, respectively carbon material is employed. Here, high performance carbons are understood to be known carbon materials with high thermal resistance (above 300° C.) and/or high solvent resistance (for example, to acetone, toluol, nitro, alcohol or acetic acid). With that, a filler content of 5–30% has proved itself, in particular 30%.

Particularly good results can be aimed at if the ceramic material comprises aluminium oxide or silicon carbide.

Particularly good sealing and wear properties will result if at least one of the sealing surfaces of the system components possesses a surface roughness of less than $Ra=0.3u$.

The invention is more closely explained in the following examples, with the aid of the drawings. Namely:

FIG. 1—the schematic representation of a rotary evaporator and

Figure 2:
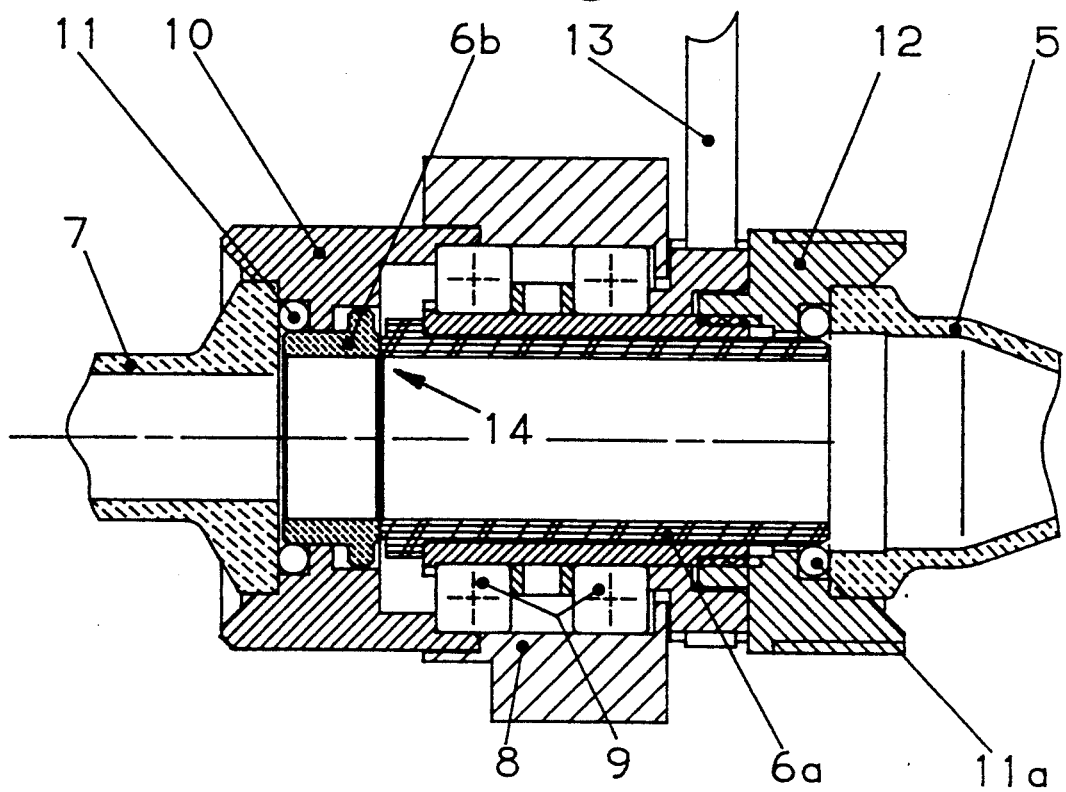

FIG. 2—an embodiment of a sealing device with the features of the invention.

According to FIG. 1, a rotary evaporator 1 possesses a stand part 2, onto which a motor 3 is fixed, which drives the evaporator flask 5 by means of a drive and gear component 4. As a vapour duct arrangement, a vapour duct pipe 6 (FIG. 2) runs through the drive component 4, through which vapour, rising out of the flask 5, is led to a cooler 7. The cooler 7 is, with that, fixed to the drive device, in a known way, to be stationary.

According to FIG. 2, the drive component 4 possesses a tube shaped jacket 8, in which the vapour duct pipe 6 is mounted in bearings. With that, the pipe 6 comprises two pipe components 6a and 6b. The pipe component 6a is mounted in the jacket 8 by means of ball bearings 9 and the pipe component 6b is connected with the jacket 8 to be firmly fixed, via an intermediate component 10, this means therefore, that it is held stationary, together with the cooler 7, by the drive component 4. A seal 11 seals off the cooler 7 from component 6B.

On the other hand, the pipe component 6a is connected by means of a seal 11a and a connecting piece 12 to the flask 5 and rotates with the flask. With that, the drive ensues by means of a schematically suggested belt 13.

Both the pipe components 6a, 6b make contact with one another on their facing sides to form a seal in the region 14. The pipe component 6a comprises, with that, filled polytetrafluorethylene (PTFE). The surface of the pipe component 6a, in the area of the sealing surface 14, possesses a roughness of less than $Ra=1,6\mu$.

Component 6b comprises a ceramic material, namely aluminium oxide B40 from the Feldmühle Aktiengesellschaft, D-7310 Plochingen.

The surface of the component 6b, in the area of the seal 14, possesses a surface roughness of less than $Ra=0.5\mu$. This roughness can be achieved through grinding.

In practical application, naturally other ceramic materials can be employed, such as for example zirkon oxide, or silicon carbide. It would also be conceivable to manufacture both components 6a and 6b from ceramic materials. Here, the absolutely flat formation of the sealing surfaces is essential, together with a surface finish which ensures low roughness and, with that, low wear and good sealing properties.

In place of PTFE, other plastic materials can be used, such as, in particular, FEP, PFA, PCTFE, PPS, PPO or carbon/graphite.

In the case of the example embodiment, the pipe component 6a is formed to be longer than the pipe component 6b, mainly because of the mounting by means of two ball bearings 9. Depending on the mode of application, naturally both components can be formed to be either the same, or shorter or longer.

I claim:

1. In a rotary evaporator having a rotatable evaporating flask connected to a fixed, stationary cooler by means of a vapor duct arrangement, and a drive mechanism for rotating the flask, the improvement wherein the vapor duct arrangement comprises at least two relatively rotatable tubular components, each within the drive mechanism, including a stationary tubular component on the side nearer the cooler and a rotatable tubular component on the side nearer the flask, said components having respective opposed sealing surfaces forming a rotary seal within said drive mechanism.

2. Sealing device according to claim 1, wherein the components (6a, 6b) comprise two differing materials.

3. Sealing device according to claim 2, wherein one of the components (6a) comprises a plastic and/or a carbon, respectively graphite material.

4. Sealing device according to claim 3, wherein the plastic is a PTFE material, in particular a PTFE compound or Teflon.

5. Sealing device according to claim 4, wherein the PTFE material contains glass, other high performance plastics or carbon, respectively carbon material types, as a filler.

6. Sealing device according to claim 5, wherein the filler proportion amounts to 5% to 30%, preferably 15%W (Weight percentage).

7. Sealing device according to claim 2, wherein at least one of the components (6a, 6b) comprises a ceramic or a glass material.

8. Sealing device according to claim 7, wherein the ceramic material comprises aluminium oxide.

9. Sealing device according to claim 7, wherein the ceramic material comprises silicon carbide, zirkon oxide.

10. Sealing device according to claim 1, wherein at least one of the sealing surfaces possesses a surface roughness of less than $Ra=0.3\mu$.

* * * * *